United States Patent
Akiyama et al.

(10) Patent No.: US 9,235,174 B2
(45) Date of Patent: Jan. 12, 2016

(54) FIXING MEMBER MANUFACTURING METHOD AND FIXING MEMBER MANUFACTURING APPARATUS

(71) Applicant: CANON KABUSHIKI KAISHA, Tokyo (JP)

(72) Inventors: Naoki Akiyama, Toride (JP); Hiroto Sugimoto, Toride (JP); Yasuhiro Miyahara, Tokyo (JP); Kazuo Kishino, Yokohama (JP); Yoshiaki Yoshida, Toride (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/063,224

(22) Filed: Oct. 25, 2013

(65) Prior Publication Data

US 2014/0116612 A1   May 1, 2014

(30) Foreign Application Priority Data

Oct. 29, 2012   (JP) ................. 2012-237945

(51) Int. Cl.
*B29C 65/00*   (2006.01)
*B32B 37/00*   (2006.01)
(Continued)

(52) U.S. Cl.
CPC ............ *G03G 15/2057* (2013.01); *B29C 63/18* (2013.01); *B29C 65/4835* (2013.01);
(Continued)

(58) Field of Classification Search
CPC ........... G03G 15/2057; G03G 15/2017; B29C 65/18; B29C 65/48; B29C 65/4835; B29C 66/5221; B29C 66/52272; B29C 66/71; B29C 66/712; B29C 63/00; B29C 63/18; B29C 63/0047; B29C 63/0069; B29C 2063/485; B29L 2031/324; B29L 2023/00; B29L 2023/22; B29D 99/0035; B32B 15/06; B32B 1/08; B32B 37/00; B32B 37/12; B32B 37/1207

USPC .......... 156/60, 160, 165, 229, 250, 267, 290, 156/291, 293, 294, 295, 296, 303.1, 349, 156/350, 358, 391, 423, 494, 510, 538, 539, 156/556, 574, 578, 580, 581, 583.1
See application file for complete search history.

(56) References Cited

U.S. PATENT DOCUMENTS 8,086,160 B2   12/2011  Nishizawa et al.
2009/0092426 A1*   4/2009  Nishizawa et al. ........... 399/331
2013/0202333 A1   8/2013  Sugimoto

FOREIGN PATENT DOCUMENTS

CN   101743518 A   6/2010
JP   63-298383 A   12/1988
(Continued)

OTHER PUBLICATIONS

U.S. Appl. No. 14/064,328, filed Oct. 28, 2013, Miyahara et al.
(Continued)

*Primary Examiner* — Philip Tucker
*Assistant Examiner* — Brian R Slawski
(74) *Attorney, Agent, or Firm* — Fitzpatrick, Cella, Harper & Scinto

(57) ABSTRACT

A fixing member manufacturing method includes: a first step of externally fitting a resin tube around an elastic material; and a second step of squeezing an excessive adhesive between the elastic material and the resin tube. The second step includes: a step of externally fitting, around the resin tube in a longitudinal end side, a ring member having an inner diameter larger than an outer diameter of the resin tube externally fitted around the elastic material; and a step of moving the ring member from the longitudinal end side toward another longitudinal end side of the resin tube while bringing the ring member into contact with an outer peripheral surface of the resin tube by air pressure.

11 Claims, 12 Drawing Sheets

(51) Int. Cl.
- *B32B 38/04* (2006.01)
- *G03G 15/20* (2006.01)
- *B29C 65/48* (2006.01)
- *B29C 63/18* (2006.01)
- *B32B 37/12* (2006.01)

(52) U.S. Cl.
CPC ....... *B29C66/5221* (2013.01); *B29C 66/52272* (2013.01); *B32B 37/1207* (2013.01); *G03G 15/2017* (2013.01); *G03G 2215/2032* (2013.01); *Y10T 156/1082* (2015.01); *Y10T 156/12* (2015.01); *Y10T 156/17* (2015.01)

(56) References Cited

FOREIGN PATENT DOCUMENTS

| | | |
|---|---|---|
| JP | 2002-36360 A | 2/2002 |
| JP | 2002036360 A * | 2/2002 ............. B29C 63/18 |
| JP | 2005-238765 A | 9/2005 |
| JP | 2005238765 A * | 9/2005 ............. B29C 63/18 |
| JP | 2010-143118 A | 7/2010 |

OTHER PUBLICATIONS

U.S. Appl. No. 14/064,335, filed Oct. 28, 2013, Miyahara et al.

U.S. Appl. No. 14/060,936, filed Oct. 23, 2013, Akiyama et al.

U.S. Appl. No. 14/063,229, filed Oct. 25, 2013, Akiyama et al.

U.S. Appl. No. 14/158,098, filed Jan. 17, 2014, Miura et al.

Office Action in Chinese Application No. 201310519869.2 (dated Aug. 13, 2015).

\* cited by examiner (a)

(b)

FIXING MEMBER MANUFACTURING METHOD AND FIXING MEMBER MANUFACTURING APPARATUS

FIELD OF THE INVENTION AND RELATED ART

The present invention relates to a fixing member manufacturing method and a fixing member manufacturing apparatus.

As a fixing member used in a fixing device to be conventionally mounted in an image forming apparatus of an electrophotographic type, a fixing member of a type in which an elastic material (e.g., a silicone rubber layer) is coated with a resin tube (e.g., a fluorine-containing resin tube) has been known.

As a method for manufacturing such a fixing member including the elastic material coated with the resin tube, the following method (Japanese Laid-Open Patent Application (JP-A) Sho 63-298383) has been known. Specifically, in this method, on an inner peripheral surface of a metal mold, a PFA (tetrafluoroethylene-perfluoroalkylvinylether copolymer) tube is fixed. Then, a core metal is inserted into the metal mold, and thereafter a silicone rubber is injected between the core metal and the PFA tube to be cured, thus integrally forming the elastic material coated with the resin tube.

However, in such a tube coating method using the metal mold, if a center axis of the core metal and a center axis of the inner peripheral surface of the metal mold are not accurately coincide with each other, cylindricity after manufacturing is deviated, so that rotation non-uniformity is undesirably generated during use.

For that reason, in order to bring a degree of run-out of a fixing roller within a predetermined range, the center axis of the roller and the center axis of the metal mold inner peripheral surface are required to be coincide with each other with high accuracy, and thus the metal mold having high shape accuracy is needed, so that there was a problem of a high manufacturing cost.

As a method in which such a metal mold having high shape accuracy is not needed and in which a rubber roller is inexpossively coated with the resin tube in a simple step, the following method (JP-A 2002-36360) has been known. Specifically, in this method, an adhesive is applied onto an outer peripheral surface of the elastic material (rubber layer), and thereafter the resin tube is externally fitted around the elastic material coated with the adhesive. Then, an excessive adhesive located between the elastic material and the resin tube is squeezed by using a squeezing ring having a diameter smaller than an outer diameter of the resin tube placed in a state in which the resin tube is externally fitted around the elastic layer (elastic material).

However, in this method, in the case where the elastic material and the outer diameter of the resin tube have variations due to production error, the diameter of the squeezing R is a certain diameter, and therefore there is a fear that the squeezing step cannot be performed properly.

Further, as a similar method, the following method (JP-A 2005-238765) has been known. Specifically, in this method, a ring(-like) member having a diameter slightly larger than an outer diameter of the resin tube externally fitted around the elastic material is used. The ring member is provided with an air ejection port at an inner peripheral surface. When an excessive adhesive located between the elastic material and the resin tube is squeezed, the ring member is moved from a longitudinal end side to another longitudinal end side of the resin tube while blowing the air from the ring member to the resin tube.

However, in this method, as described in Comparison example appearing hereinafter, the squeezing step is performed by the air while maintaining a non-contact state of the ring member with the resin tube, and therefore there is a fear that the squeezing of the adhesive cannot be properly made.

SUMMARY OF THE INVENTION

A principal object of the present invention is to provide a fixing member manufacturing method and a fixing member manufacturing apparatus which are capable of properly squeezing an excessive adhesive from between a resin tube and an elastic material.

According to an aspect of the present invention, there is provided a fixing member manufacturing method comprising: a first step of externally fitting a resin tube around an elastic material; and a second step of squeezing an excessive adhesive from between the elastic material and the resin tube, wherein the second step comprises: a step of externally fitting, around the resin tube in a longitudinal end side, a ring member having an inner diameter larger than an outer diameter of the resin tube externally fitted around the elastic material; and a step of moving the ring member from the longitudinal end side toward another longitudinal end side of the resin tube while bringing the ring member into contact with an outer peripheral surface of the resin tube by air pressure.

According to another aspect of the present invention, there is provided a fixing member manufacturing apparatus comprising: a mechanism configured to externally fit a resin tube around an elastic material; and a mechanism configured to squeeze an excessive adhesive from between the elastic material and the resin tube, wherein the squeezing mechanism comprises: a ring member having an inner diameter larger than an outer diameter of the resin tube externally fitted around the elastic material; and a mechanism configured to move the ring member from the longitudinal end side toward another longitudinal end side of the resin tube while bringing the ring member into contact with an outer peripheral surface of the resin tube by air pressure.

These and other objects, features and advantages of the present invention will become more apparent upon a consideration of the following description of the preferred embodiments of the present invention taken in conjunction with the accompanying drawings.

Figure 2:
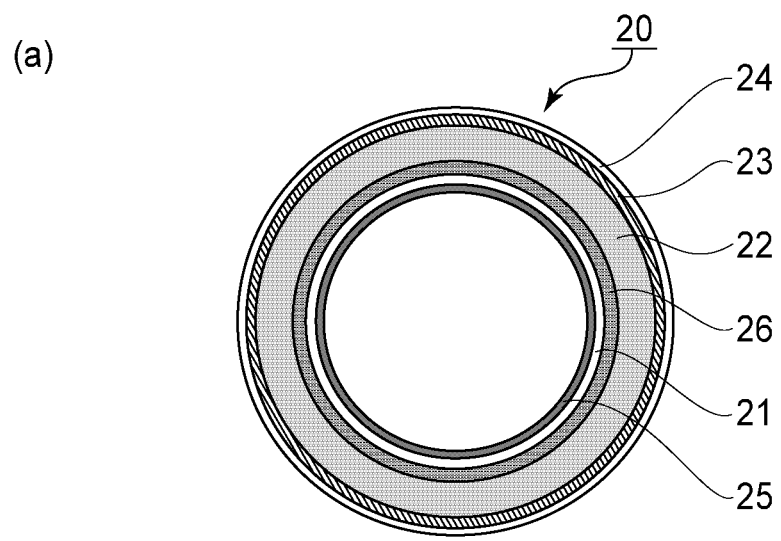
Figure 2:
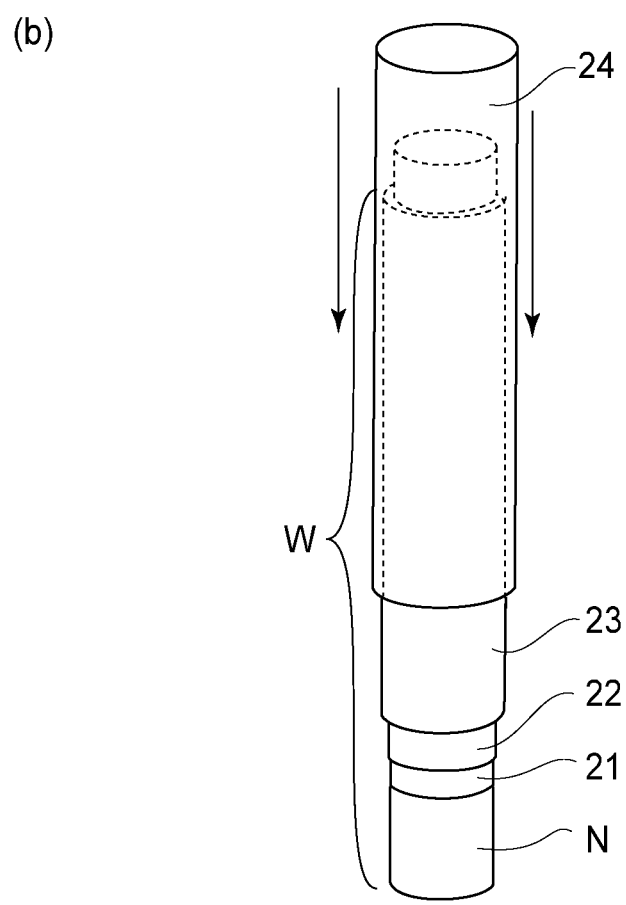

Parts (a) and (b) of FIG. 2 are schematic views for illustrating a layer structure of a fixing belt (or a pressing belt).

Figure 3:
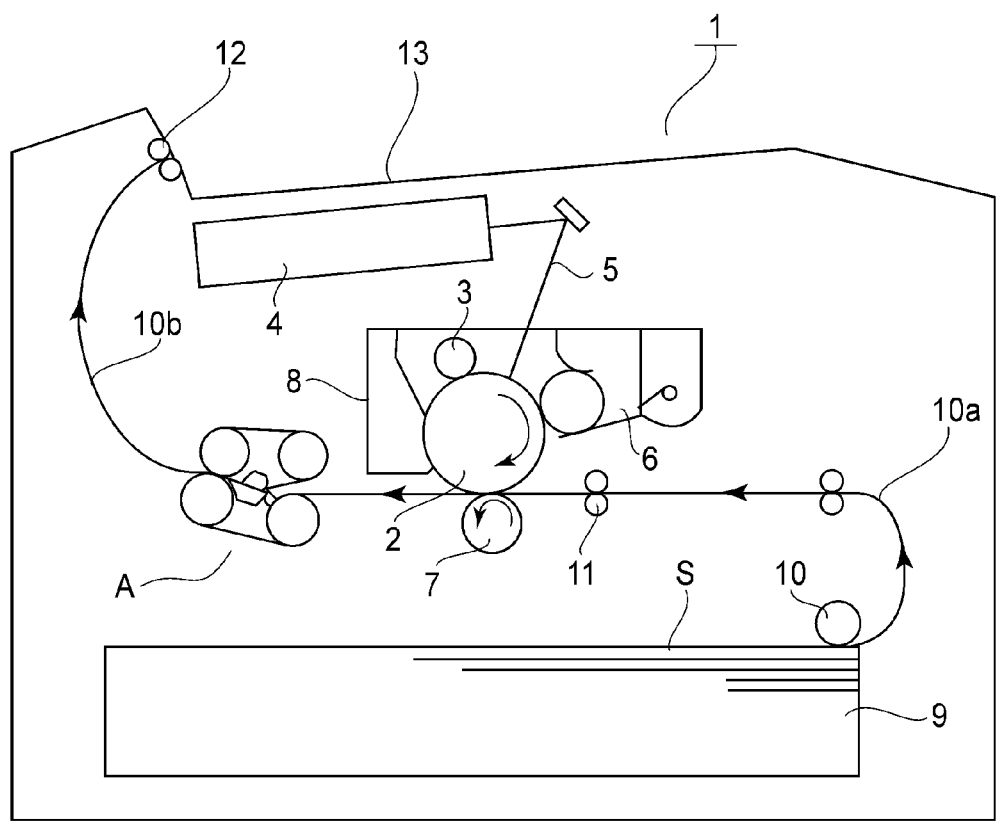

FIG. 3 is a schematic view for illustrating a structure of an image forming apparatus as an example.

Figure 4:
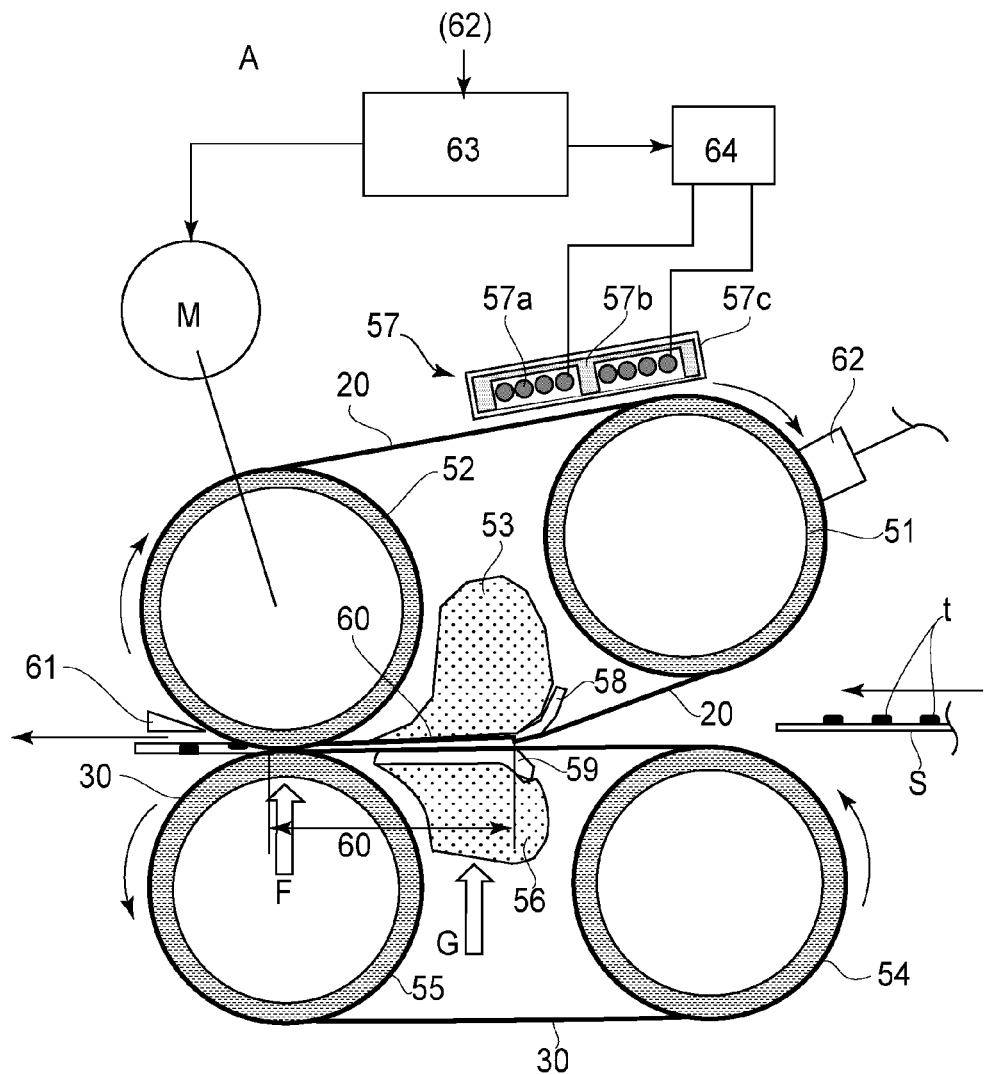

FIG. 4 is a schematic view for illustrating a fixing device in Embodiment 1.

Figure 5:
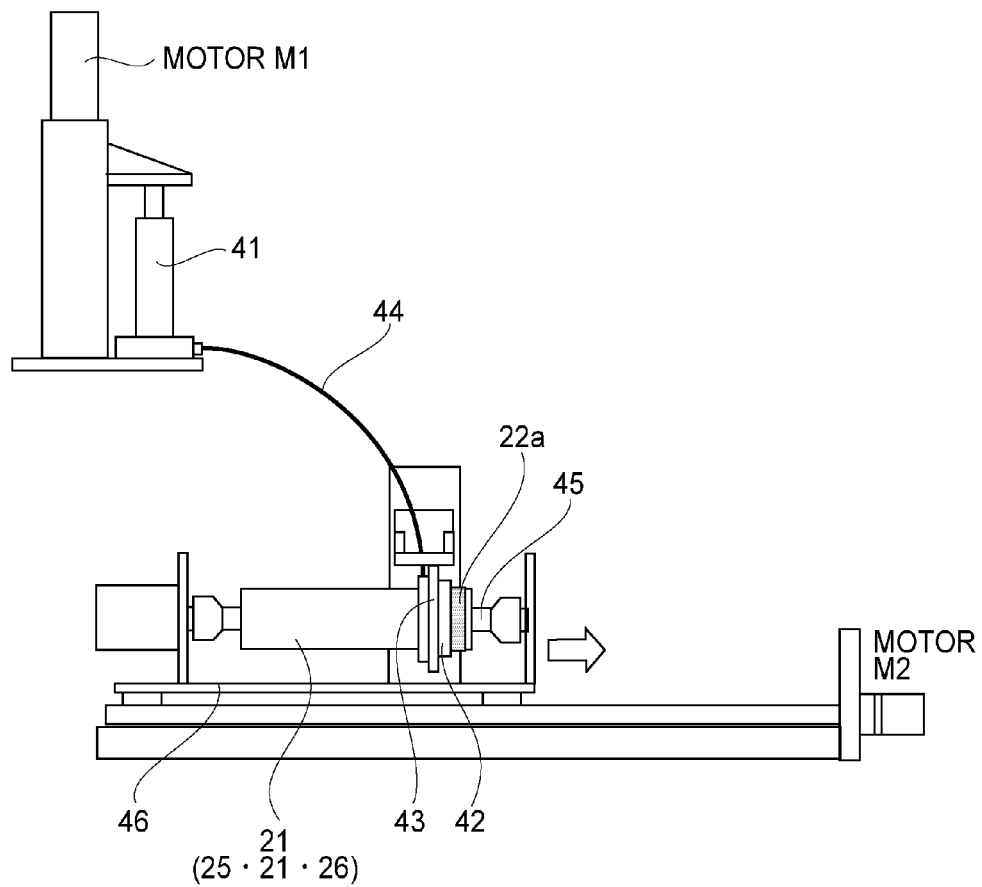

FIG. 5 is a schematic view for illustrating a forming method of an elastic layer of the fixing belt (or pressing belt).

Figure 6:
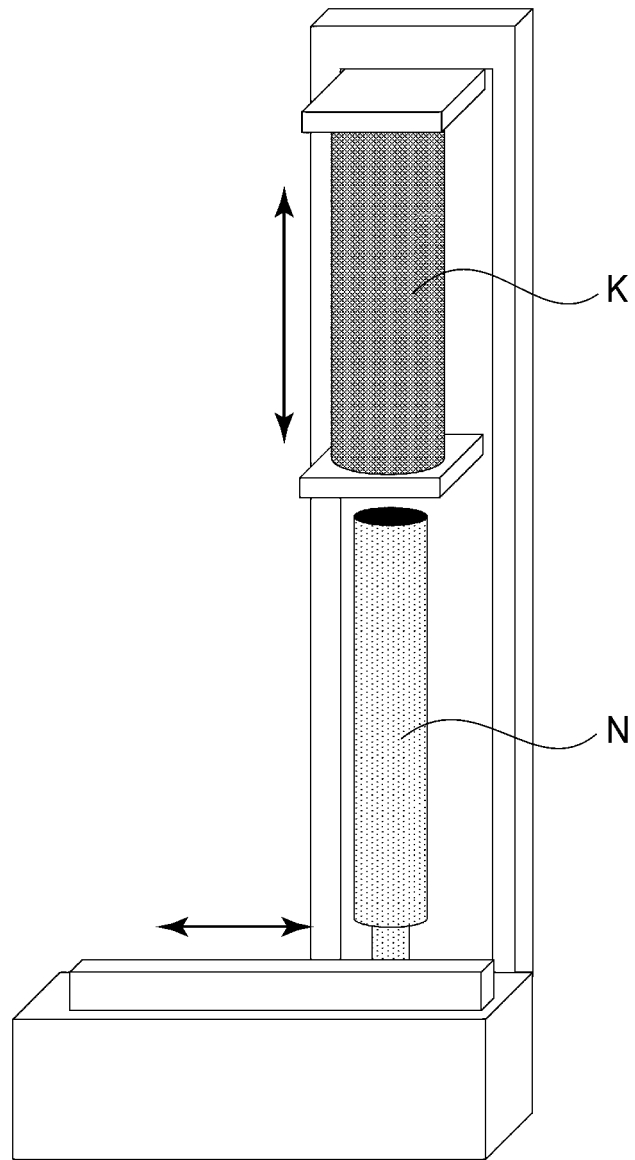

FIG. 6 is a schematic view for illustrating an outer appearance of a PFA tube coating for the fixing belt (or pressing belt).

Figure 7:
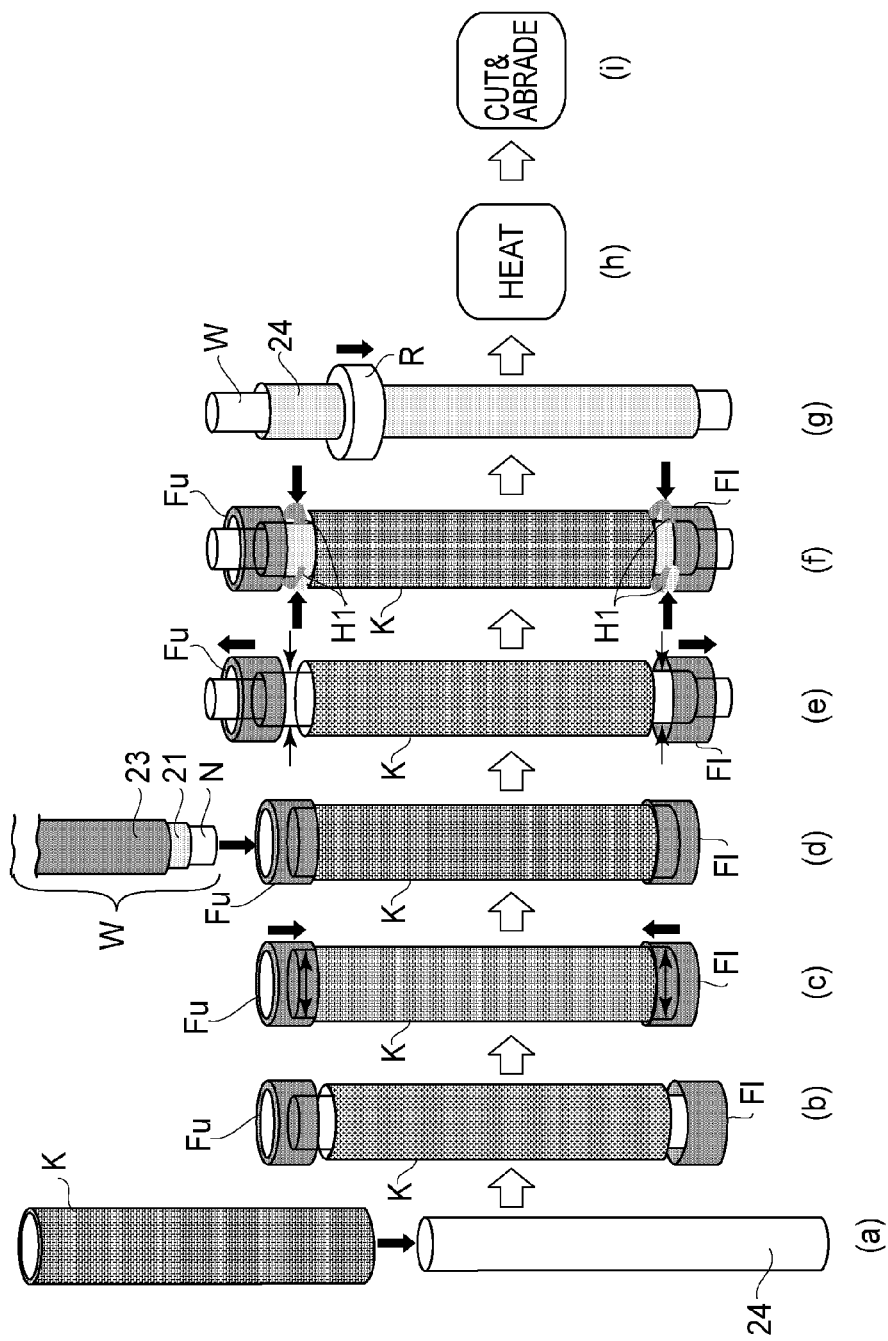

Parts (a) to (i) of FIG. 7 are schematic views for illustrating a PFA tube coating method for the fixing belt (or the pressing belt).

Figure 8:
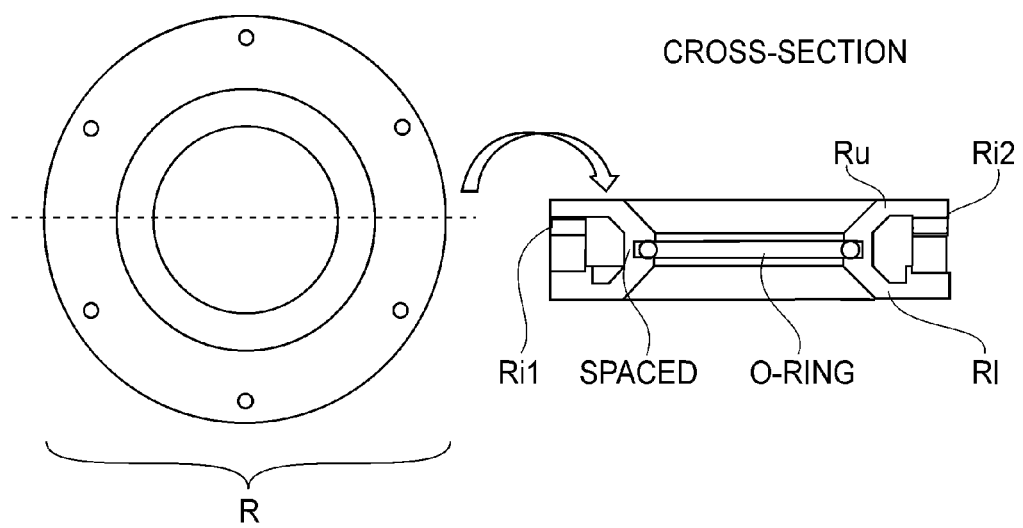

FIG. 8 is a schematic view for illustrating the squeezing ring member in Embodiment 1.

Figure 9:
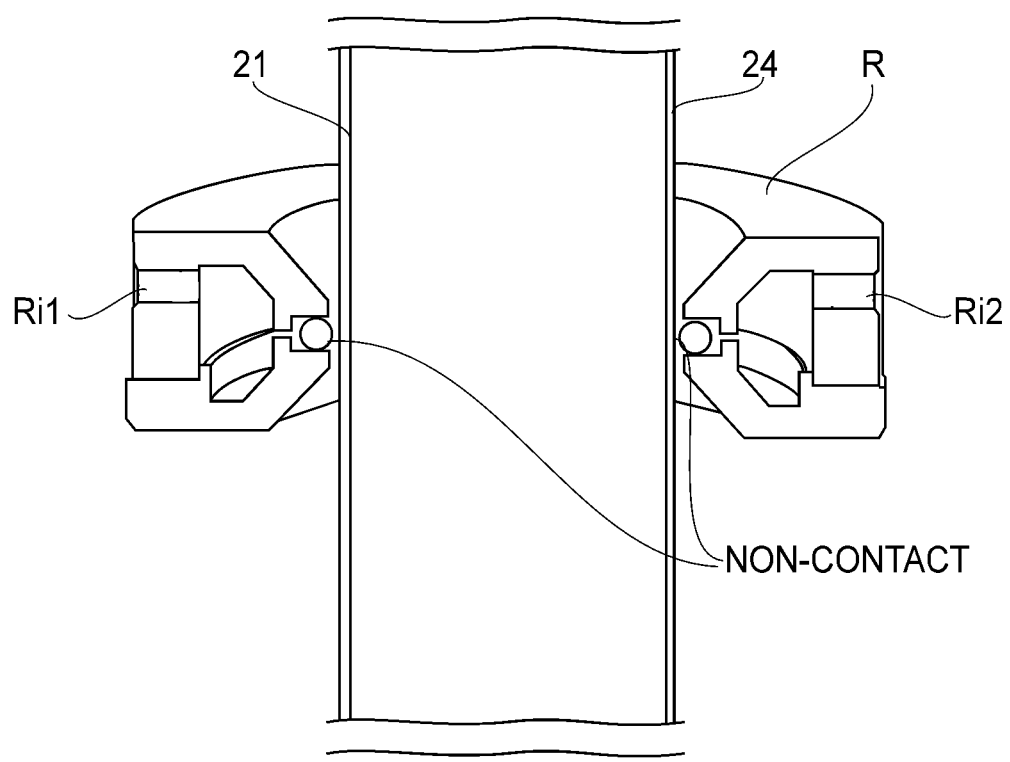

FIG. 9 is a schematic view for illustrating a state in which pressure is not applied to the squeezing ring member in Embodiment 1.

Figure 10:
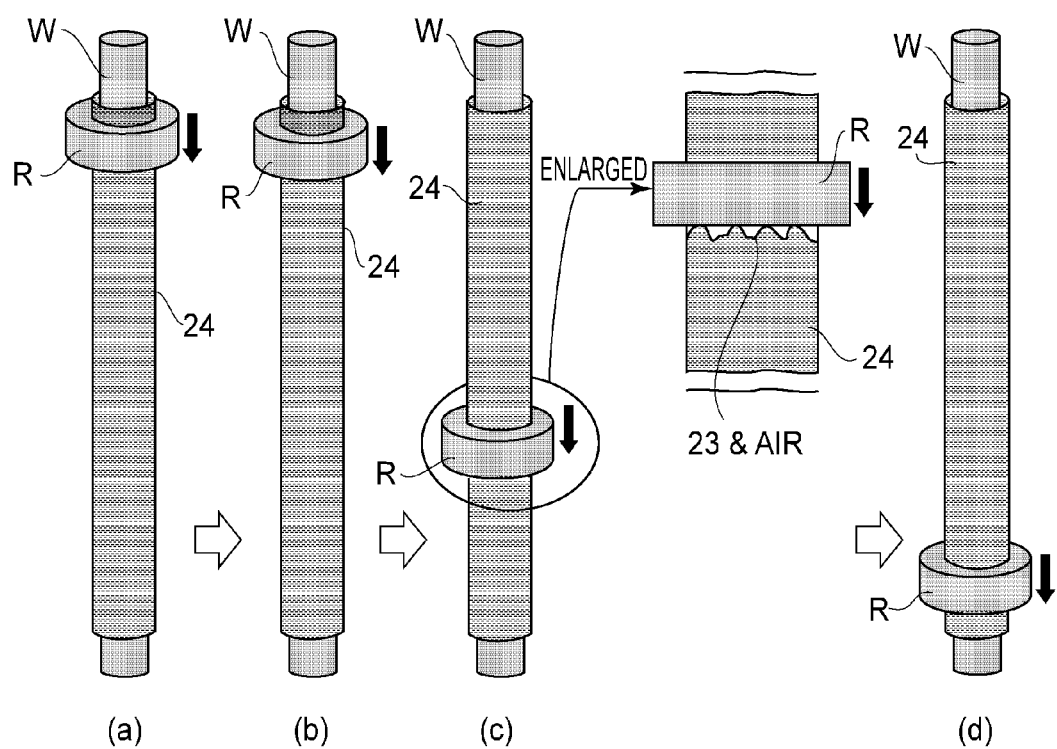

Parts (a) to (d) of FIG. 10 are a schematic view for illustrating a squeezing method in Embodiments 1 and 2 and Comparison example.

Figure 11:
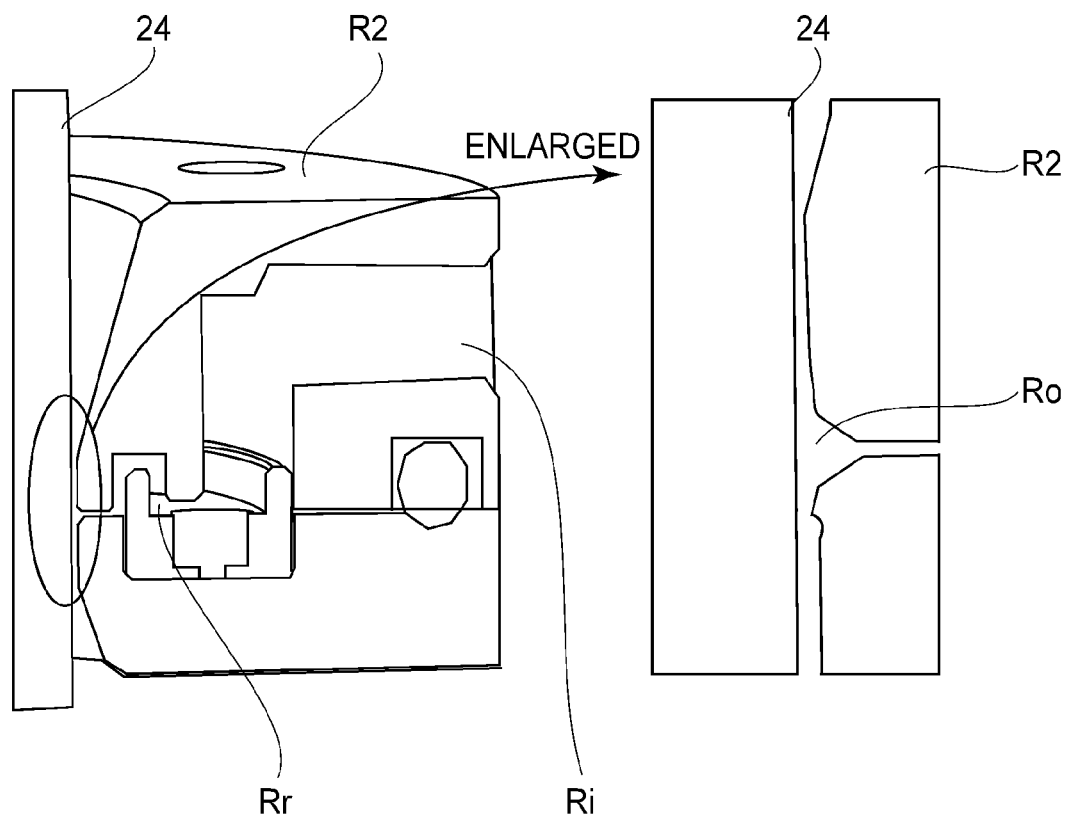

FIG. 11 is a schematic view for illustrating a squeezing ring member in Comparison example to be compared with Embodiment 1.

Figure 12:
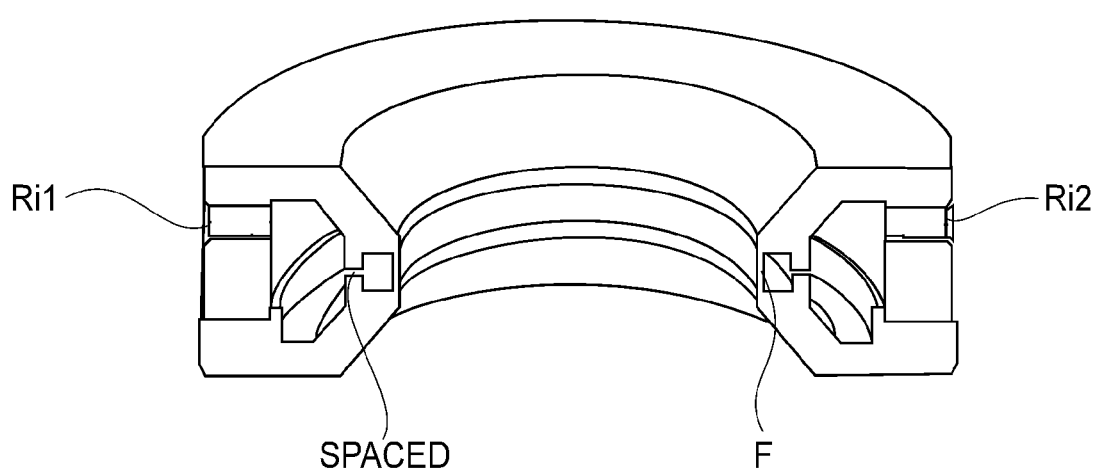

FIG. 12 is a schematic view for illustrating a squeezing ring member in Embodiment 2.

DESCRIPTION OF THE PREFERRED EMBODIMENTS

The present invention will be described specifically based on embodiments. Incidentally, although these embodiments are examples of embodiments to which the present invention, but the present invention is not limited thereto, and various modifications can be made within a range of the concept of the present invention.

[Embodiment 1]

(1) Image Forming Apparatus

FIG. 3 is a schematic illustration showing a general structure of an image forming apparatus used in this embodiment. An image forming apparatus 1 is a laser printer of an electrophotographic type and includes a photosensitive drum 2 as an image bearing member for bearing a latent image. The photosensitive drum 2 is rotationally driven in the clockwise direction at a predetermined peripheral speed, so that an outer surface of the photosensitive drum 2 is electrically charged uniformly to a predetermined polarity and a predetermined potential. The uniformed charged surface of the photosensitive drum 2 is exposed to laser light 5 based on image information by a laser scanner (optical device) 4. As a result, on the surface of the photosensitive drum 2, an electrostatic latent image corresponding to the image information of the laser light is formed.

The electrostatic latent image is developed as a toner image by a developing device 6. The toner image is successively transferred onto a recording material (sheet) S, introduced into a transfer portion as a contact portion between the photosensitive drum 2 and a transfer roller 7, at the transfer portion.

Sheets of the recording material S are stacked and accommodated in a sheet feeding cassette 9 provided at a lower portion of the image forming apparatus. At predetermined sheet feeding timing, when a sheet feeding roller 10 is driven, the sheets of the recording material S in the sheet feeding cassette 9 are separated and fed one by one, and then the separated and fed recording material S passes through a conveying passage 10a to reach a registration roller pair 11. The registration roller pair 11 receives a leading edge portion of the recording material S to rectify oblique movement of the recording material S. The recording material S is sent to the transfer portion in synchronism with the toner image on the photosensitive drum 2 so that timing when a leading end portion of the toner image on the photosensitive drum 2 reaches the transfer portion coincides with timing when also the leading edge portion of the recording material S just reaches the transfer portion.

The recording material S passing through the transfer portion is separated from the surface of the photosensitive drum 2, and then is conveyed into an image fixing device A. By the fixing device A, the unfixed toner image on the recording material S is fixed as a fixed image on the recording material surface under application of heat and pressure. Then, the recording material S passes through a conveying passage 10b and then is discharged and placed on a discharge tray 13, by a discharging roller pair 12, provided at an upper portion of the image forming apparatus. Further, the surface of the photosensitive drum 2 after the recording material separation is cleaned by removing a residual deposited matter such as a transfer residual toner by a cleaning device 9, thus being repetitively subjected to image formation.

(2) Fixing Device A

FIG. 4 is a schematic illustration showing a general structure of the fixing device A. The fixing device A is of a twin belt type and of an electromagnetic induction heating type.

Here, with respect to the fixing device A and members constituting the fixing device A, a longitudinal direction refers to a direction parallel to a direction perpendicular to a recording material conveyance direction in a plane of a recording material conveying passage. With respect to the fixing device, a front (side or surface) refers to a side or surface in a recording material introducing side. Left and right refer to left and right as seen from the front side of the fixing device. A width of the belt refers to a dimension of the belt with respect to the direction perpendicular to the recording material conveyance direction, i.e., the dimension of the belt with respect to the longitudinal direction. A width of the recording material refers to a dimension of the recording material with respect to the direction perpendicular to the recording material conveyance direction in a plane of the recording material. Further, upstream and downstream refer to upstream and downstream with respect to the recording material conveyance direction.

The fixing device A includes a fixing belt (heating member) 20 and a pressing belt (pressing member) 30 between which a nip where the recording material is heated and pressed which being nipped and conveyed is to be formed. Both of the fixing belt 20 and the pressing belt 30 are a flexible endless belt.

A structure of the fixing belt 20 will be specifically described later in (3). The fixing belt 20 is extended and stretched around a tension roller 51 and a fixing roller 52 which are provided, as a belt stretching member, in parallel to each other with a spacing, and a downward fixing pad 53 which is provided, as a first photosensitive drum, between the rollers 51 and 52. Each of the tension roller 51 and the fixing roller 52 is shaft-supported rotatably between left and right side plates of a fixing device casing (not shown). The fixing pad 53 is supported and disposed between the left and right side plates of the fixing device casing.

The tension roller 51 is an iron-made hollow roller of 20 mm in outer diameter, 18 mm in inner diameter and 1 mm in thickness, and provides tension to the fixing belt 20.

The fixing roller 52 is an elastic roller, having a high sliding property, which is prepared by forming a silicone rubber elastic layer, as an elastic layer, on an iron alloy-made hollow core metal of 20 mm in outer diameter, 18 mm in inner diameter and 1 mm in thickness. The fixing roller 52 is used as a driving roller into which a driving force is inputted from a driving source (motor) M via an unshown driving gear train, thus being rotationally driven in the clockwise direction of an arrow at a predetermined speed.

By providing the fixing roller 52 with the elastic layer as described above, it is possible to satisfactorily transmit the driving force, inputted into the fixing roller 52, to the fixing belt 20, and at the same time, it is possible to form a fixing nip for ensuring a separating property of the recording material S from the fixing belt 20. Hardness of the silicone rubber is 15 degrees in terms of JIS-A hardness. The silicone rubber elastic layer is also effective in shortening a warming-up time since an amount of heat conduction to the inside is also decreased.

The pressing belt 30 is prepared, in this embodiment, by providing, on a base layer of electroformed nickel, a 30 μm-thick tube of PFA, which is a fluorine-containing resin material, as a surface parting layer. In FIG. 4, the pressing belt 30 is located below the fixing belt 20 and is disposed in the following manner. That is, the pressing belt 30 is extended and stretched around a tension roller 54 and a pressing roller 55 which are provided, as a belt stretching member, in parallel to each other with a spacing, and a upward fixing belt 56 which is provided, as a second photosensitive drum, between the rollers 54 and 55. Each of the tension roller 54 and the pressing roller 55 is shaft-supported rotatably between left and right side plates of a fixing device casing (not shown).

The tension roller 54 is prepared by forming a silicone sponge layer for decreasing a degree of heat conduction from the pressing belt 30 by decreasing heat conductivity, on an iron alloy-made hollow core metal of 20 mm in outer diameter, 16 mm in inner diameter and 2 mm in thickness. The tension roller 54 provides tension to the pressing belt 30. The pressing roller 55 is an iron alloy-made hollow rigid roller, having a low sliding property, of 20 mm in outer diameter, 16 mm in inner diameter and 2 mm in thickness. The pressing pad 56 is supported and disposed between the left and right side plates of the fixing device casing.

Further, in order to form a fixing nip 60 as an image heating portion between the fixing belt 20 and the pressing belt 30, the pressing roller 55 is pressed at each of left and right end portions of a rotation shaft thereof by a pressing mechanism (not shown) toward the fixing roller 52 in an arrow F direction at a predetermined pressure.

Further, in order to obtain a wide fixing nip 60 without upsizing the fixing device, the pressing pad 56 is employed. That is, the fixing belt 20 is pressed toward the pressing belt 30 by the fixing pad 53, and at the same time, the pressing belt 30 is pressed toward the fixing belt 20 by the pressing pad 56. The pressing pad 56 is pressed toward the fixing pad 53 in an arrow G direction at predetermined pressure by a pressing mechanism (not shown). The fixing belt 20 and the pressing belt 30 are press-contacted to each other between the fixing pad 53 and the pressing pad 56, so that the wide fixing nip 60 is formed with respect to the recording material conveyance direction.

The fixing pad 53 includes a pad substrate and a slidable sheet (low-friction sheet) 58 contacted to the fixing belt inner surface. The pressing pad 56 includes a pad substrate and a slidable sheet 59 contacted to the pressing belt inner surface. This is because in the case where the belt base layer is formed of metal, there is a problem that an amount of abrasion (wearing) of a portion of the pad sliding on the inner peripheral surface of the belt is large. By interposing each of the slidable sheets 58 and 59 between the belt and the pad substrate, the abrasion of the pad can be prevented and it is also possible to reduce sliding resistance, and therefore it is possible to ensure a good belt travelling property and a good belt durability.

As a heating means for the fixing belt 20, a heating source (induction heating member, exciting coil) of an electromagnetic induction heating type having high energy efficiency is employed. An induction heating member 57 as the heating source is provided, with a slight gap, opposed to an outer surface of an upper-side belt portion of the fixing belt 20.

The induction heating member 57 is constituted by an induction coil 57a, an exciting core 57b and a coil holder 57c for holding the coil and the core. The induction coil 57a is wound in an elongated circular and flat shape by using Litz wire and is provided in the exciting core 57b formed in a downward E shape projected to a central portion and end portions of the induction coil 57a. The exciting core is formed by using a material, having high magnetic permeability and low residual magnetic flux density, such as ferrite or permalloy, and therefore loss of the induction coil 57a and the exciting core 57b can be suppressed, so that it is possible to efficiently heat the fixing belt 20.

A fixing operation is as follows. A control circuit portion 63 drives a motor M at least during execution of image formation. Further, a high-frequency current is carried from an exciting circuit 64 through the induction coil 57a of the induction heating member 57.

By driving the motor M, the fixing roller 52 is rotationally driven. As a result, the fixing belt 20 is rotationally driven in the same direction as the fixing roller 52. A peripheral speed of the fixing belt 20 is slightly slower than a conveyance speed of the recording material (sheet) S conveyed from the image forming portion in order to form a loop on the recording material S in a recording material entrance side of the fixing nip 60. In this embodiment, the peripheral speed of the fixing belt 20 is 300 mm/sec, so that a full-color image can be formed on an A4-sized sheet at a rate of 70 sheets/min.

The pressing belt 30 is rotated by the rotation of the fixing belt 20 by a frictional force with the fixing belt 20 at the fixing nip 60. Here, by employing a constitution in which a downstreammost portion of the fixing nip 60 is conveyed by sandwiching the fixing belt 20 and the pressing belt 30 between the roller pair 52 and 55, slip of the belt can be prevented. The downstreammost portion of the fixing nip 60 is a portion where a pressure distribution (with respect to the recording material conveyance direction) at the fixing nip 60 is maximum.

the other hand, by passing the high-frequency current from the exciting circuit 54 through the induction coil 57a of the induction heating member 57, the metal layer of the fixing belt 20 generates heat by induction heating, so that the fixing belt 20 is heated. A surface temperature of the fixing belt 20 is detected by a temperature detecting element 62 such as a thermistor. A signal relating to the temperature of the fixing belt 20 detected by the temperature detecting element 62 is inputted into the control circuit portion 63. The control circuit portion 63 controls electric power supplied from the exciting circuit 64 to the induction coil 57a so that temperature information inputted from the temperature detecting element 62 is maintained at a predetermined fixing temperature, thus controlling the temperature of the belt 20 at the predetermined fixing temperature.

In a state in which the fixing belt 20 is rotationally driven and is increased up to the predetermined fixing temperature to be temperature-controlled, into the fixing nip 60 between the fixing belt 20 and the pressing belt 30, the recording material S on which the unfixed toner image t is carried is conveyed. The recording material S is introduced with the surface, toward the fixing belt 20, where the unfixed toner image t is carried. Then, the recording material S is nipped and conveyed through the fixing nip 60 while intimately contacting the outer peripheral surface of the fixing belt 20 at the unfixed toner image carrying surface thereof, so that the recording material S is supplied with heat and pressure from the fixing belt 20, and thus the unfixed toner image t is fixed on the surface of the recording material S.

Further, the fixing roller 32 in the fixing belt 20 in the elastic roller having the rubber layer, and the pressing roller 55 in the pressing belt 30 is the iron alloy-made rigid roller, and therefore a degree of deformation of the fixing roller 52 is large at an exit of the fixing nip 60 between the fixing belt 20 and the pressing belt 30. As a result, also the fixing belt 20 is larger deformed, so that the recording material S on which the fixed toner image is carried is curvature-separated from the fixing belt 20 by its own resilience. At the fixing nip exit, a separation assisting claw member 61 is provided.

(3) Fixing Belt 20

Part (a) of FIG. 2 is schematic sectional view showing a layer structure of the fixing belt 20 as the fixing member in this embodiment, and (b) of FIG. 2 is a schematic view for illustrating a manner of lamination of constituent layers. The fixing belt 20 includes a base material (cylindrical substrate) 21, an inner surface slidable layer 25 provided on an inner peripheral surface of the base material 21, a primer layer (adhesive layer) 26 with which an outer peripheral surface of the base material 21 is coated, an elastic (cylindrical elastic material) 22 provided on the primer layer 26, and a resin tube, e.g., a fluorine-containing resin tube in this embodiment, as a surface layer (toner parting layer 24). The resin tube 24 is fixed by an adhesive layer 23 onto the peripheral surface of the elastic layer 22.

The fixing belt 20 in this embodiment is a laminated composite layer member having the above-mentioned 6 layers, and is a thin fixing member having flexibility as a whole and low thermal capacity. Further, the fixing belt 20 holds a substantially cylindrical shape in a free state thereof. The respective constituent layers will be specifically described below.

(3-1) Base Material 21

In this embodiment, in order to heat the base material 21 by the above-described induction heating member 57, the base material 21 for the fixing belt 20 is formed in a metal layer of SUS alloy, nickel, iron, magnetic stainless steel, cobalt-nickel alloy, or the like. In this embodiment, an electroformed nickel belt of 55 mm in inner diameter and 65 μm in thickness is used as the base material 21.

The thickness of the base material 21 may preferably be 1-300 μm. When the thickness of the base material 21 is smaller than 1 μm, rigidity is low, and therefore it becomes difficult to withstand a durability test of a large number of sheets. Further, when the thickness of the base material 21 exceeds 300 μm, the rigidity becomes excessively high, and flexing resistance is lowered, so that use of the resultant belt as the rotatable belt member is not practical. In an preferred embodiment, the thickness of the base material 21 is ideal that it is 20 μm to 100 μm.

(3-2) Inner Surface Slidable Layer 25

As a material for the inner surface slidable layer 25, a resin material, such as polyimide resin, having high durability and high heat resistance is suitable. In this embodiment, a polyimide precursor solution obtained by reaction, in an organic polar solvent, of aromatic tetracarboxylic dianhydride or its derivative with aromatic diamine in a substantially equimolecular amount was applied onto the inner surface of the base material 21. Thereafter, the solution was dried and heated to form a polyimide resin layer by dewatering cyclization reaction, thus preparing the inner surface slidable layer 25.

(3-3) Elastic Layer 22

Over the outer peripheral surface of the base material 21, the elastic layer 22 is provided via the primer layer 26. As a material for the elastic layer 22, a known elastic material can be used. For example, silicone rubber, fluorine-containing rubber and the like can be used.

The thickness of the elastic layer 22 may preferably be 100 μm or more in order to prevent uneven glossiness caused due to unevenness of the recording material S or failure that the heating surface of the fixing belt cannot follow the unevenness in the case where an image is printed.

When the thickness of the elastic layer 22 is less than 100 μm, a function of the elastic layer 22 as an elastic member cannot be readily achieved, and therefore a pressure distribution during fixing becomes non-uniform, so that particularly during full-color image fixing, an unfixed toner (image) of a secondary color cannot be sufficiently heat-fixed to cause non-uniformity of gloss on a fixed image. Further, due to insufficient melting, a color-mixing property of the toner is lowered, so that a high-definition full-color image cannot be obtained, thus being unpreferable. In this embodiment, silicone rubber is used as the material for the elastic layer 22, and the elastic layer 22 is 6 degrees in JIS-A hardness, 0.8 W/mk in thermal conductivity and 450 μm in thickness.

A coating method of the elastic layer 22 will be described with reference to FIG. 5.

FIG. 5 shows an example of a coating step of forming the silicone rubber layer as the elastic layer 22 by a coating device, and is a schematic view for illustrating a method using a so-called ring-coating (method).

In this embodiment, the addition curing type silicone rubber composition in which the addition curing type silicone rubber and the filler are mixed is charged into a cylinder pump 41. Then, the composition is pressured-fed from the cylindrical pump 41 to a ring-shaped coating head 42, so that the addition curing type silicone rubber composition is applied onto the peripheral surface of the cylindrical substrate 21 (25, 21, 26) from a coating liquid supply nozzle (not shown) provided inside the ring-shaped coating head 42. The peripheral surface of the cylindrical substrate 21 has been subjected to primer treatment in advance by a known method.

The coating head 42 is held by a fixed coating head holding portion 43. The cylinder pump 41 is driven by a motor M1 to press-feed the addition curing type silicone rubber composition to the coating head 43 via a tube 44.

The cylindrical substrate 21 (exactly the structure consisting of the layers 25, 21, 26, 22, 23 and 24) is externally fitted and held around a cylindrical core metal held by a core metal holding tool (fixture) 45. The core metal holding tool 45 is held by a coating table 46 so that an axis thereof is horizontal, and thus is horizontally movable. The ring-shaped coating head 42 is coaxially and externally fitted around the cylindrical substrate 20b. The coating table 46 is reciprocated in a horizontal axis direction of the core metal holding tool 45 at a predetermined speed by a motor M2.

Simultaneously with the coating by the coating head 42, by moving (reciprocating) the cylindrical substrate 21 in a right direction in FIG. 5, a coated film (layer) 22a of the addition curing type silicone rubber composition can be cylindrically formed on the peripheral surface of the cylindrical substrate 21.

A thickness of the coated film 22a can be controlled by a clearance between the coating liquid supply nozzle and the cylindrical substrate 21, a supplying (feeding) speed of the silicone rubber composition, a moving speed of the cylindrical substrate 21, and the like.

The addition curing type silicone rubber composition layer 22b formed on primer layer 26 (formed on the cylindrical substrate 21) is heated for a certain time by a heating means such as electric furnace to cause crosslinking reaction, so that the silicone rubber elastic layer 22 can be formed. In this embodiment, the silicone rubber composition layer 22a was heated at 200° C. for 30 minutes in the electric furnace.

(3-4) Adhesive Layer 23

The adhesive layer 23 for fixing the fluorine-containing resin tube as the surface layer 24 over the cured silicone rubber layer as the elastic layer 22 is uniformly applied in a thickness of 1-10 μm onto the surface of the elastic layer 20d (an adhesive coating step in which the outer peripheral surface of the elastic layer is coated with the adhesive). In this embodiment, the adhesive 23 is constituted by a cured material of an addition curing type silicone rubber adhesive. The addition curing type silicone rubber adhesive 23 contains an addition curing type silicone rubber in which a self-adhesive component is mixed.

Specifically, the addition curing type silicone rubber adhesive 23 contains organopolysiloxane having unsaturated hydrocarbon group represented by vinyl group, hydrogen organopolysiloxane, and a platinum compound as a crosslinking catalyst. The adhesive 20e is cured (hardened) by addition reaction. As such an adhesive 20e, a known adhesive can be used.

In this embodiment, the layer of the adhesive in an uncured state of liquid or paste was uniformly applied in a thickness of about 5 µm.

(3-5) Fluorine-Containing Resin Tube 24

As the surface layer of the fixing member, from the viewpoints of a molding property and a toner parting property, a fluorine-containing resin tube 24 as the resin tube obtained by extrusion molding is used.

As the fluorine-containing resin material, a tetrafluoroethylene/perfluoroalkylvinyl ether copolymer (PFA) excellent in heat resistance is suitably used (PFA tube).

The PFA tube used is formed by the extrusion molding. A type of copolymerization of a starting material for PFA is not limited particularly but may include, e.g., random copolymerization, block copolymerization, graft copolymerization, and the like.

Further, a content molar ratio between tetrafluoroethylene (TFE) and perfluoroalkylvinyl ether (PAVE) which are the starting material for PFA is not limited particularly. For example, the content molar ratio of TFE/PAVE may suitably be 94/6 to 99/1.

As other fluorine-containing resin materials, it is possible to use tetrafluoroethylene/hexafluoropropylene copolymer (FEP), polytetrafluoroethylene (PTFE), ethylene/tetrafluoroethylene copolymer (ETFE), polychlorotrifluoroethylene (PCTFE), ethylene/chlorotrifluoroethylene copolymer (ECTFE), polyvinylidene fluoride (PVDF), and the like. These fluorine-containing resin materials can be used singly or in combination of two or more species.

In this embodiment, the PFA tube obtained by the extrusion molding was used. A thickness of the rube was 50 µm. An inner diameter of the tube was smaller than an outer diameter of the elastic layer 22, and was 52 mm. An inner surface of the rube has been subjected to the ammonia treatment in order to improve the adhesive property.

(3-6) Fluorine-Containing Resin Tube Coating Step

In this embodiment, a method in which the PFA tube 24 as the surface layer is expanded and the adhesive layers 23 is coated with the PFA tube 24 (expansion coating method in a step in which the cylindrical elastic layer 22 coated with the adhesive 23 is coated with the fluorine-containing resin tube 24) was used. FIG. 6 is a schematic view showing an outer appearance of a device (apparatus) for coating the base material 21, on which the silicone rubber layer 22 is laminated, with the PFA tube 24 by the expansion coating method. In this device, on a core N ((b) of FIG. 2), a base material W (25, 21, 26, 22, 23) is set, and then the base material W is coated with the PFA tube 24 disposed at an inner surface of a tube expansion mold K in accordance with the expansion coating method. Flow of the expansion coating method will be described with reference to FIG. 7.

(a) Tube Insertion

The PFA tube 24 is disposed, by using an externally fitting mechanism, inside (inserted into) a metal-made tube expansion mold K having an inner diameter larger than an outer diameter of a base material W ((b) of FIG. 2) including the silicone rubber layer as the elastic layer 22.

(b) Holding at End Portions

The PFA tube 24 disposed inside the expansion mold K is held (gripped) by holding members (holding tools or gripping tools) Fu and Fl at end portions. Specifically, the tube 24 is held at a longitudinal end portion by the holding member Fu and the other longitudinal end portion by the holding member Fl.

(c) Vacuum Expansion

Next, by a moving mechanism (shortening mechanism), the PFA tube is shortened (flexed) by a predetermined length obtained in advance with respect to a longitudinal direction. Specifically, the moving mechanism moves the holding members Fu and Fl in a PFA holding state, toward each other so that a distance between the two holding members Fu and Fl are decreased by a predetermined amount.

Thereafter, a portion of a gap (spacing) between the outer surface of the PFA tube 24 and the inner surface of the expansion mold K is placed in a vacuum state (state of negative pressure relative to ambient pressure. In the vacuum state (5 kPa), the PFA tube 24 is expanded, so that the outer surface of the PFA tube 24 intimately contacts the inner surface of the expansion mold K.

(d) Insertion of Base Material W

On a core N, the base material W (25, 21, 26, 22, 23) is set (externally fitted) by the externally fitting mechanism, and then the resultant structure is inserted into the expansion mold K inside which the PFA tube 24 is expanded. The surface of the silicone rubber layer 22 is uniformly applied (coated) with the layer 23 of the addition curing type silicone rubber adhesive, in the uncured state of liquid or paste, in advance.

The inner diameter of the expansion mold K is not limited particularly when the inner diameter is in a range in which the insertion of the base material W is smoothly performed.

(e) Vacuum Elimination and Elongation

After the base material W is disposed in the expansion mold K, the vacuum state (state of the negative pressure relative to the ambient pressure) in which the gap portion between the outer surface of the PFA tube 24 and the inner surface of the expansion mold K is eliminated (removed). By eliminating the vacuum state, the increased diameter of the PFA tube 24 is decreased to a diameter which is the same as the outer diameter of the base material W including the silicone rubber layer 23, so that the PFA tube 24 and the surface of the silicone rubber layer 22 are placed in a state in which the surfaces thereof are intimately contacted to via the adhesive layer 23.

Next, the PFA tube 24 is elongated to a predetermined elongation (percentage) by an elongation mechanism (fluorine-containing resin tube elongation in longitudinal direction). Specifically, the elongating mechanism moves the holding members Fu and Fl in the PFA tube holding state, away from each other so that the distance between the holding members Fu and Fl is increased by a position distance.

When the PFA tube 24 is elongated, the addition curing type silicone rubber adhesive 23 disposed between the PFA resin tube 24 and the silicone rubber layer 22 performs the function of a lubricant, so that the PFA tube 24 can be smoothly elongated.

The longitudinal elongation of the PFA tube in this embodiment was 6% (on the basis of a full length of the fluorine-containing resin tube with which the cylindrical elastic layer is coated). By elongating the PFA tube 24 in the longitudinal direction, the PFA tube 24 does not readily generate creases thereon, so that the fixing belt having high durability is obtained.

The above-described steps (a) to (e) constitute a fluorine-containing resin (material) coating step.

(f) Calking Step (Temporary Fixing Step) Between Elastic Layer 22 and Fluorine-Containing Resin Tube 24

In this step, the elastic layer 22 and the PFA tube 24 are bonded (temporarily fixed) at longitudinal end portions in parallel in order to maintain the longitudinal elongation of the PFA tube 24 and also in order to prevent the PFA tube 24 from contracting in the longitudinal direction in a heating step (h) described later. The PFA tube 24 is heated at the longitudinal end portions (to be cut away in later step) thereof by a calking bit (heating mechanism) in which a heater is incorporated, so that the elastic layer 22 and the PFA tube 24 are locally bonded by the addition curing type silicone rubber adhesive 23. A caulking portion (temporary fixing portion) of at least the longitudinal end portion of the PFA tube 24 is constituted such that a plurality of portions where the elastic layer 22 is to be bonded and a plurality of portions where the elastic layer 22 is not bonded are alternately provided.

(g) Squeezing Step

Between the elastic layer 22 and the PFA tube 24, the excessive addition curing type silicone rubber adhesive 23 which does not contribute to the bonding and the air taken (included) during the tube coating are present. When the fixing belt 20 is prepared while leaving the excessive adhesive and the air between the elastic layer 22 and the PFA tube 24, the residual adhesive (and the air) portion is increased in thickness and is changed in thermal conductivity, thus causing image defect. This step is a step of squeezing (removing) the excessive adhesive and the air by a squeezing mechanism.

Although details will be described later in (3-7), the base material W coated with the PFA tube 24 (i.e., a tube-coated member) is taken out from the expansion mold K. Then, during a normal operation, the squeezing mechanism R having an inner diameter slightly larger than an outer diameter of the base material W is externally engaged with the PFA tube 24 with which the base material W is coated. Then, the squeezing mechanism R is moved from an upper end portion (one end portion) to a lower end portion (another end portion) of the PFA tube with which the base material W is coated, in the longitudinal direction (axial direction) of the tube. The squeezing mechanism R is moved while jetting the air (at air pressure of 0.5 MPa) from the squeezing mechanism R toward the surface of the PFA tube 24 in a direction perpendicular to the circumferential direction of the PFA tube 24.

As a result, the excessive addition curing type silicone rubber adhesive 23, which does not contribute to the bonding, and the air taken during the tube coating which are present between the elastic layer 22 and the PFA tube 24 are squeezed out (removed) (step of squeezing the excessive adhesive between the base material and the tube).

(h) Heating (Treatment)

After the squeezing step, by effecting heating (at 150° C. for 20 minutes in the electric furnace as the heating mechanism), the addition curing type silicone rubber adhesive 23 is cured as a whole. As a result, the PFA tube 24 and the elastic layer 22 are fixed over the entire region via the cured adhesive 23 (adhesive curing step).

(i) Cut and Abrasion

After the heating, the base material W (25, 21, 26, 22, 23, 24) is cut in a predetermined length by a cutting mechanism at end portions thereof. Specifically, the cutting mechanism cuts the base material W so that the longitudinal end portions of the resin tube, i.e., regions where the elastic layer 22 and the PFA tube 24 are temporarily fixed are cut away from the base material W. Thereafter, the cut surface was abraded, so that the fixing belt 20 was completed.

By such a series of manufacturing steps, a manufacturing process of the fixing belt 20 is completed.

The base material 21 having a length of 420 mm was used, and a position where the coating of the base material 21 with the silicone rubber layer as the elastic layer 22 was started was about 8 mm from the edge of the base material 21. Further, a position where the coating of the base material 21 with the silicone rubber layer as the elastic layer 22 was ended was about 8 mm from the other edge, opposite from the edge in the coating start side, of the base material 21. The cutting position is 25 mm from each of the edges of the base material 21. An abrasion amount is 1 mm. Therefore, a range of 184 mm from the (longitudinal) center of the base material 21 toward each of longitudinal ends of the base material 21 is used for the fixing belt 20. This range is referred to as a product region. A region other than the product region is referred to as an out-of-product region.

(3-7) Method of Squeezing Adhesive 23 Between Elastic Layer 22 and Fluorine-Containing Resin Tube 24 and Air Taken During Fluorine-Containing Resin Tube Coating in This Embodiment (Squeezing Step)

Figure 1:
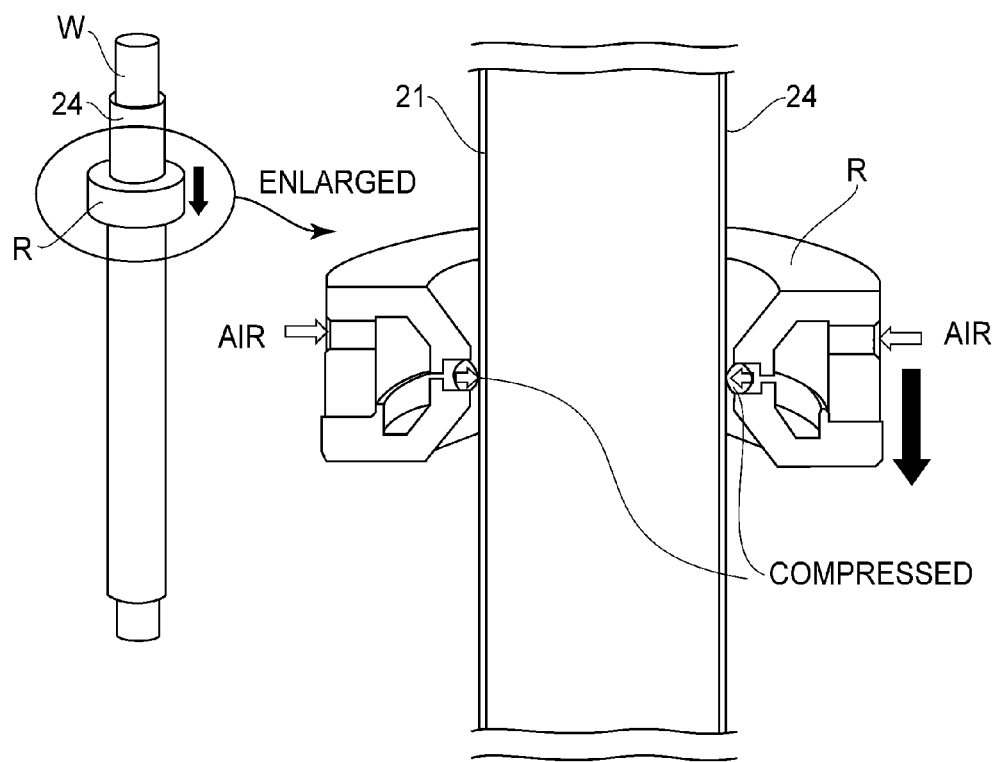
FIG. 1 is a schematic view for illustrating a structure and positional relationship of a fluorine-containing resin tube as a surface layer and a squeezing ring(-like) member in Embodiment 1.

Between the elastic layer 22 and the PFA tube 24, an excessive addition curing type silicone rubber adhesive 23, which does not contribute to the bonding and the air taken when the elastic layer 22 is coated with the PFA tube 24 are present (located). A method for squeezing out the excessive adhesive and the air will be described with reference to FIG. 1.

The squeezing mechanism R has, at room temperature, an inner diameter which is about 2.2 mm larger than an outer diameter of the base material W (including the PFA tube externally fitted around the elastic layer 22) coated with the PFA tube 24. The squeezing mechanism R includes therein an O-ring O (also referred to as a squeezing ring) which is the ring(-like) member having the inner diameter (bore) which is about 1 mm larger than the outer diameter of the base material W coated with the PFA tube 24 (in room-temperature state). A mechanism for applying air pressure (pneumatic pressure as air applying mechanism) to the O-ring O by an air supplying mechanism (air pump) is employed (step of applying pressure to the squeezing ring).

As described above, the squeezing mechanism R including the O-ring O inside thereof is externally fitted around the base material W, coated with the PFA tube 24, at an upper end portion (in one end side of the tube-coated member (W and 24). That is, the O-ring O is positioned so as to overlap with the base material W, coated with the PFA tube 24, at the upper end portion (longitudinal end portion of the tube-coated member). Then, air pressure (0.5 MPa) is applied. As a result, the inner diameter of the O-ring O is decreased (i.e., contracted by air pressure).

That is, the squeezing ring has the bore (inner diameter) larger than the outer diameter of the tube-coated member (W and 24) during a normal state (in which no air pressure is applied). Then, by applying the pressure to the squeezing ring, the bore of the squeezing ring is decreased, so that the O-ring O is pressed against the PFA tube 24 over the entire outer peripheral surface of the PFA tube 24.

In a state in which the O-ring O is pressed against the PFA tube 24, the squeezing mechanism R is moved in the longitudinal direction (axial direction) of the PFA tube. As a result, the excessive addition curing type product region adhesive 23 and the air, taken (included) during the coating with the PFA tube 24, which are located between the elastic layer 22 and the PFA tube 24, one squeezed out (i.e., the adhesive interposed between the base material and the tube is squeezed).

When the squeezing mechanism R is moved in the longitudinal direction of the PFA tube 24, in the case where slip is not good, the squeezing mechanism R may also be moved after silicone oil or the like is applied onto the surface of the PFA tube 24.

A structure of the squeezing mechanism R will be described with reference to FIG. 8. FIG. 8 includes a plan view and a cross-sectional view. The squeezing mechanism R includes an upper part Ru and a lower part Rl which sandwich the O-ring O. As a material for the upper part Ru and the lower part Rl, in consideration of durability, SUS 304 (stainless steel) was used.

As the O-ring O, a rubber ring ("CO0054", manufactured by NOK Corp.) which is an elastic member of 57.6 mm in inner diameter and 5.7 mm in thickness was used. The upper part Ru is provided with air supply ports Ri1 and Ri2 which have a structure such that when the air is supplied from an air supplying mechanism, the O-ring O is pressed toward the inside. When the pressure is applied from the outside of the O-ring O by air pressure, the O-ring O is pressed inward, but the base material W coated with the PFA tube 24 is disposed inside the O-ring O during the squeezing, and thus functions as a wall. Therefore, the O-ring O is prevented from being disengaged with the squeezing mechanism R.

Further, the PFA tube 24 is disposed inside the O-ring O, and therefore is liable to elongate vertically correspondingly to a degree of contraction by the air pressure pressing from the outside. For that reason, the O-ring O is pressed against the upper part Ru and the lower part Rl, so that the air does not readily leak out. When the air supply is stopped (i.e., when the pressure is returned to the ambient pressure), the size of the O-ring O is restored to the original size by a restoring force (elastic force) of the O-ring O.

Further, in order to restore the size of the O-ring O to the original size with reliability, suction (negative pressure) may also be performed through the air supply ports Ri1 and Ri2 (step of applying the negative pressure to the squeezing ring).

A positional relationship between the O-ring O and the PFA tube 24 under no application of the air pressure will be described with reference to FIG. 9. FIG. 9 is a schematic view when the base material W is vertically cut along the longitudinal direction thereof.

When the air pressure is not applied, the inner diameter is the original diameter (size) (which is about 1 mm larger than the outer diameter of the base material W coated with the PFA tube 24), and is sandwiched between the upper part Ru and the lower part Rl. The surface of the PFA tube 24 and the O-ring O are in non-contact with each other. The surface of the PFA tube 24 and the O-ring O are spaced by about 0.5 mm. Therefore, the squeezing mechanism R can be easily positioned at (externally fitted over) the upper end portion (longitudinal end side) of the base material W coated with the PFA tube 24.

In this embodiment, as described above, a constitution in which the O-ring O is contracted by using the air pressure is employed, and therefore by adjusting (increasing and decreasing) the air pressure, the constitution can quickly meet even the case where the outer diameter of an object to be closely contacted to the O-ring O (i.e., the outer diameter of the resin tube in a state in which the resin tube is externally fitted around the elastic layer).

A method, in this embodiment, in which the adhesive interposed between the elastic layer 22 and the fluorine-containing resin tube 24 and the air taken during the fluorine-containing resin tube coating and squeezed will be described with reference to (a) to (d) of FIG. 10.

(a) The squeezing mechanism R is positioned at a longitudinal end portion of the base material W coated with the PFA tube 24. At this time, no air pressure is applied to the O-ring O. Then, the squeezing mechanism R is moved from the longitudinal end portion to another longitudinal end portion of the PFA tube 24.

(b) At the time before the O-ring O overlaps with a product region (at the position of 2 mm in front of the product region), the air pressure (0.5 MPa) is applied, so that the O-ring O is closely (intimately) contacted to the outer peripheral surface of the PFA tube 24. Thereafter, the squeezing mechanism R is also continuously moved toward another longitudinal end portion of the PFA tube 24. As a result, the excessive addition curing type silicone rubber adhesive 23 interposed between the elastic layer 22 and the PFA tube 24 and the air taken during the coating with the PFA tube 24 are gradually squeezed.

(c) During passing of the O-ring O through the product region, the squeezing mechanism R is moved toward another longitudinal end portion of the PFA tube 24 while maintaining a state of application of the air pressure (0.5 MPa).

(d) When the O-ring O reaches a position outside the product region (position of about 5 mm, in an out-of-product region, from the product region), the air pressure is eliminated (i.e., the pressure is returned to the ambient pressure). In other words, the pressure application to the squeezing ring is stopped, and then the bore of the squeezing ring is restored to the original bore. As a result, the squeezed adhesive 23 and the squeezed air are left in the out-of-product region (in another longitudinal end side of the base material W). Thereafter, the squeezing mechanism R is disengaged by a moving mechanism (disengaging mechanism W coated with the PFA tube 24 (i.e., the squeezing R is disengaged from the outer peripheral surface of the tube-coated member).

Thereafter, as shown in the above-described steps (h) and (i) of FIG. 7, the base material W coated with the PFA tube 24 was heated, cut and abraded, so that the fixing belt 20 was completed.

Although 100 fixing belts 20 were completed (prepared) by the method in this embodiment, there was no occurrence of a phenomenon that the squeezed adhesive 23 was adhered to the member (core) N ((b) of FIG. 2) holding the base material W. Further, the prepared 100 fixing belts 20 were checked with respect to another appearance, but a defective portion where squeezing non-uniformity or the like was generated was not observed. By using the fixing belt 20 manufactured in this embodiment, when a solid image was outputted in an OHP sheet (a transparent resin sheet for an overhead projector), image defect was not generated.

(4) Comparison Example

In Comparison example, as the squeezing method, the above-described squeezing method described in JP-A 2005-238765 is used. By using this method, the fixing belt 20 was prepared.

A difference between Embodiment 1 and Comparison example is only that ring members used in the squeezing step are different from each other. In this embodiment, as the ring member, the squeezing mechanism R was used in the squeezing step, but in Comparison example, a squeezing mechanism R2 was used. The squeezing mechanism R2 will be described with reference to FIG. 11. FIG. 11 shows a cross-section of the squeezing mechanism R2.

The air is supplied from an unshown supplying mechanism toward the squeezing mechanism R2 at air pressure of 0.5

MPa, and then is jetted from an air jetting port Ro through an air supply port Ri and an air passage Rr. The squeezing mechanism R2 is moved in the longitudinal direction of the PFA tube 24 while jetting the air through the air jetting port Ro. As a material for the squeezing mechanism R2, in consideration of durability, SUS 304 (stainless steel) was used. In the neighborhood of the air jetting port Ro, the PFA tube 24 and the squeezing mechanism R2 are close to each other.

The air pressure is, based on the law of fluid mechanics (dynamics), lowered with an increased gap between the PFA tube 24 and the squeezing mechanism R2. That is, squeezing power is improved with a closer state between the surface of the PFA tube 24 and the squeezing mechanism R2. However, manufacturing variations are generated with respect to the PFA tube 24 and the elastic layer 22, and therefore when the surface of the PFA tube 24 and the squeezing mechanism R2 are excessively close to each other, those members are in contact with each other, so that the surface of the PFA tube 24 is damaged to cause image defect.

In Comparison example, in consideration of manufacturing variations of the PFA tube 24, the elastic layer 22 and the like, there was a need to ensure the gap of about 0.6 mm, in a closest position, between the PFA tube 24 and the squeezing mechanism R2. Further, there is a need to convey the excessive adhesive or the like in a movement direction of the squeezing mechanism R2, and therefore the gap is increased along the movement direction to increase an air amount, so that the squeezed adhesive and the like are conveyed.

A method, in Comparison example, in which the adhesive interposed between the elastic layer 22 and the fluorine-containing resin tube 24 and the air taken during the fluorine-containing resin tube coating and squeezed was the same as in this embodiment (Embodiment 1), and will be described with reference to (a) to (d) of FIG. 10.

(a) The squeezing mechanism R2 is positioned at a longitudinal end portion of the base material W coated with the PFA tube 24. At this time, no air pressure is applied to the squeezing mechanism R2. Then, the squeezing mechanism R2 is moved in the longitudinal direction of the PFA tube 24.

(b) At the time before the squeezing mechanism R2 enters a product region (at the position of 2 mm in front of the product region), the air (air pressure: 0.5 MPa) is supplied. Thereafter, the squeezing mechanism R2 is also continuously moved toward another longitudinal end portion of the PFA tube 24. As a result, the excessive addition curing type silicone rubber adhesive 23 interposed between the elastic layer 22 and the PFA tube 24 and the air taken during the coating with the PFA tube 24 are squeezed.

(c) During passing of the squeezing mechanism R2 through the product region, the air (air pressure: 0.5 MPa) is continuously supplied, and the squeezing mechanism R2 is moved toward another longitudinal end portion of the PFA tube 24.

(d) When the squeezing mechanism R2 reaches a position outside the product region (position of about 5 mm, in an out-of-product region, from the product region), the air supply is stopped, and then the squeezed adhesive 23 and the squeezed air are left in the out-of-product region. Thereafter, the squeezing mechanism R2 is disengaged from the base material W coated with the PFA tube 24.

Thereafter, the base material W coated with the PFA tube 24 was heated, cut and abraded, so that the fixing belt 20 was completed.

Although 100 fixing belts 20 were completed (prepared) by the method in Comparison example, there was no occurrence of a phenomenon that the squeezed adhesive 23 was adhered to the member (core) holding the base material W. However, when the prepared 100 fixing belts 20 were checked with respect to another appearance, there were 12 fixing belts 20 in which a portion where the adhesive 23 was partly left in a large amount (squeezing non-uniformity) between the elastic layer 22 and the PFA tube 24 was found. When the fixing belt 20 which had caused the squeezing non-uniformity was used to output a solid image on the CHP sheet, image defect such that the squeezing non-uniformity is transferred onto the image was generated.

(5) Influence of Difference in Squeezing Method

The fixing belt 20 manufactured in this embodiment did not cause defects with respect to the outer appearance and the output image, but the fixing belt 20 manufactured in Comparison example partly caused the defects with respect to the outer appearance and the output image.

In this embodiment, when the excessive adhesive 23 and the air are squeezed out, the PFA tube 24 and the O-ring O are in contact with each other, and therefore a strong squeezing force can be applied. Further, even when there are manufacturing variations of the PFA tube 24 and the elastic layer 22 and thus the outer diameter of the base material W coated with the PFA tube 24 is changed, the inner diameter of the O-ring O is changed so as to fit the outer diameter of the base material W, and therefore the squeezing force is always maintained properly.

In Comparison example, due to the manufacturing variations of the PFA tube 24 and the elastic layer 22, when the outer diameter of the base material W coated with the PFA tube 24 is changed, the gap between the squeezing mechanism R2 and the surface of the PFA tube 24 is changed. When the gap is increased, the squeezing force is decreased, and therefore it would be considered that the excessive adhesive 23 and the air cannot be squeezed to generate the squeezing non-uniformity.

From the above result, in this embodiment, it was understood that a defective production rate was able to be lowered compared with Comparison example. In this embodiment, the bore of the squeezing ring can be decreased by using the squeezing ring having the bore (inner diameter) larger than the outer diameter of the member coated with the resin tube 24 and then by applying the pressure to the squeezing ring.

Further, in the product region (portion to be used later for the roller or the belt), the pressure is applied to the squeezing ring to decrease the bore of the ring, and then the squeezing ring is moved in the longitudinal direction of the resin tube while being brought into close contact with the outer peripheral surface of the resin tube, thus squeezing the adhesive. In the out-of-product region (portion to be cut in the later step), the pressure applied to the squeezing ring is eliminated to restore the bore of the squeezing ring to the original bore, so that the squeezing ring is placed in a non-contact state with the resin tube. For that reason, the squeezing of the adhesive is stopped, and thus the adhesive squeezed from the product region remains in the out-of-product region portion, so that the fixing belt can be manufactured without contaminating the member, which holds a member to be inserted (integrated member between the elastic material and the resin tube).

[Embodiment 2]

Embodiment 2 will be described. Constituent elements (members) identical in constitution to those in Embodiment 1 are represented by the same reference numerals or symbols as those in Embodiment 1 and will be omitted from detailed description. In this embodiment, the fixing belt manufacturing method in Embodiment 1 is applied to a pressing belt manufacturing method.

(1) Pressing Belt 30

In this embodiment, with respect to also a layer structure of the pressing belt 30, as the other fixing member of the fixing device, the same layer structure as that of the fixing belt 20 was employed. That is, similarly as in the layer structure of the fixing belt 20 shown in FIG. 2. The layer structure of the pressing belt 30 includes the base material 21, the elastic layer 22, the adhesive layer 23, the fluorine-containing resin tube 24 and the like. However, each of the base material 21, the elastic layer 22 and the fluorine-containing resin tube 24 is changed to a layer formed of an optimum material or member as that for the pressing belt 30.

(1-1) Base Material 21

As the base material 21 for the pressing belt 30, in this embodiment, an electroformed nickel belt of 55 mm in inner diameter and 50 μm in thickness is used. Similarly as in the fixing belt 20, the thickness of the base material 21 may preferably be 1-300 μm. When the thickness of the base material 21 is smaller than 1 μm, rigidity is low, and therefore it becomes difficult to withstand a durability test of a large number of sheets. Further, when the thickness of the base material 21 exceeds 300 μm, the rigidity becomes excessively high, and flexing resistance is lowered, so that use of the resultant belt as the rotatable belt member is not practical.

(1-2) Elastic Layer 22 and Manufacturing Method of Elastic Layer 22

Over the outer peripheral surface of the base material 21, the elastic layer 22 is provided via the primer layer 26. As a material for the elastic layer 22, a known elastic material can be used. For example, silicone rubber, fluorine-containing rubber and the like can be used. In this embodiment, silicone rubber is used as the material for the elastic layer 22, and the elastic layer 22 is 21 degrees in JIS-A hardness, 0.4 W/mk in thermal conductivity and 350 μm in thickness. As a coating method, similarly as in Embodiment 1, the so-called ring coating (method) was used.

In this embodiment, differences from Embodiment 1 in the step of forming the silicone rubber longitudinal 22 are as follows. That is, the differences are only the addition curing type silicone rubber composition, in which the addition curing type silicone rubber and the filler are mixed, charged into the cylinder pump 41 (FIG. 5), and a speed of movement of the base material 21 to be moved in the right direction in FIG. 5 at the certain speed simultaneously with the application (coating).

(1-3) Adhesive Layer 23

The adhesive layer 23 in this embodiment is the same as that in Embodiment 1.

(1-4) Fluorine-Containing Resin Tube 24 and Fluorine-Containing Resin Tube Coating Method In this embodiment, the PFA tube 24 obtained by the extrusion molding was used. A thickness of the rube was 30 μm. An inner diameter of the tube was smaller than an outer diameter of the elastic layer 22, and was 54 mm. An inner surface of the rube has been subjected to the ammonia treatment in order to improve the adhesive property. Further, the PFA tube 24 used in this embodiment was of a heat contraction type (in which the full length contracted by 3% when the PFA tube 24 was heated at 150° C. for 20 minutes). At the coating method, similarly as in Embodiment 1, the so-called expansion coating method was used.

In this embodiment, a difference from Embodiment 1 in fluorine-containing resin tube 24 coating step is only that a heat contraction type PFA tube 24 is used and the longitudinal elongation is changed to 3%.

(1-5) Caulking Step of Elastic Layer 22 and Fluorine-Containing Resin Tube 24

The caulking step in this embodiment is the same as that in Embodiment 1.

(1-6) Squeezing Step

Although details will be described later, the squeezing step in this embodiment is the same as that in Embodiment 1 except that a squeezing mechanism R3 in which a nitrile rubber sheet (thickness: 1 mm) is applied in place of the O-ring O of the squeezing mechanism R in Embodiment 1.

(1-7) Heating, Cut and Abrasion

In this embodiment, the respective steps consisting of the heating, and the cut and abrasion are the same as those in Embodiment 1.

The base material 21 having a length of 420 mm was used, and a position where the coating of the base material 21 with the silicone rubber layer as the elastic layer 22 was started was about 8 mm from the edge of the base material 21. Further, a position where the coating of the base material 21 with the silicone rubber layer as the elastic layer 22 was ended was about 8 mm from the other edge, opposite from the edge in the coating start side, of the base material 21. The cutting position is 35 mm from each of the edges of the base material 21. An abrasion amount is 1 mm. Therefore, a range of 174 mm from the (longitudinal) center of the base material 21 toward each of longitudinal ends of the base material 21 is used for the pressing belt 30. This range is referred to as a product region. A region other than the product region is referred to as an out-of-product region.

(2) Method of Squeezing Adhesive 23 Between Elastic Layer 22 And Fluorine-Containing Resin Tube 24 and Air Taken During Fluorine-Containing Resin Tube Coating in This Embodiment (Squeezing Step)

In this embodiment, the squeezing step is the same as that in Embodiment 1 except that the squeezing mechanism R3 is used in place of the squeezing mechanism R in Embodiment 1. With reference to FIG. 12, the squeezing mechanism R3 will be described. FIG. 12 is a sectional view of the squeezing mechanism R3. Inside the squeezing mechanism R in Embodiment 1, the O-ring O is sandwiched, but in the squeezing mechanism R3, a film F (in which the squeezing ring expands and contracts) formed with the nitrile rubber sheet (1 mm-thick elastic member) is applied onto an inner peripheral surface, in place of the O-ring O.

When the air pressure (0.5 MPa) is applied, the film F expands, so that the squeezing mechanism R3 is pressed against the PFA tube 24. In a state in which the film F is pressed against the PFA tube 24, the squeezing mechanism R3 is moved in the longitudinal direction of the PFA tube. As a result, the excessive addition curing type product region adhesive 23, which does not contribute to the bonding, and the air, taken (included) during the coating with the PFA tube 24, which are located between the elastic layer 22 and the PFA tube 24, are squeezed out.

When the squeezing mechanism R is moved in the longitudinal direction of the PFA tube 24, in the case where slip is not good, the squeezing mechanism R may also be moved after silicone oil or the like is applied onto the surface of the PFA tube 24. When the air supply is stopped (i.e., when the pressure is returned to the ambient pressure), a size of the film F is restored to an original size, so that the squeezing mechanism R3 is spaced from the PFA tube 24.

A method, in this embodiment, in which the adhesive 23 interposed between the elastic layer 22 and the fluorine-containing resin tube 24 and the air taken during the fluorine-containing resin tube coating and squeezed will be described with reference to (a) to (d) of FIG. 10.

(a) The squeezing mechanism R3 is engaged with an end portion of the base material W coated with the PFA tube 24. At this time, no air pressure is applied to the film F. Then, the squeezing mechanism R3 is moved in the longitudinal direction of the PFA tube 24.

(b) At the time before the film F enters a product region (at the position of 2 mm in front of the product region), the air pressure (0.5 MPa) is applied, and then the squeezing mechanism R3 is moved in the longitudinal direction of the PFA tube 24. As a result, the excessive addition curing type silicone rubber adhesive 23, which does not contribute to the bonding, interposed between the elastic layer 22 and the PFA tube 24 and the air taken during the coating with the PFA tube 24 are squeezed.

(c) In the product region, the squeezing mechanism R3 is moved in the longitudinal direction of the PFA tube 24 while applying the air pressure (0.5 MPa).

(d) When the film F reaches a position outside the product region (position of about 5 mm, in an out-of-product region, from the product region), the air pressure is eliminated, and then the squeezed adhesive 23 and the squeezed air are left in the out-of-product region. Thereafter, the squeezing mechanism R3 is disengaged from the base material W coated with the PFA tube 24.

Thereafter, the base material W coated with the PFA tube 24 was heated, cut and abraded, so that the fixing belt 20 was completed.

Although 100 pressing belts 30 were completed (prepared) by the method in this embodiment, there was no occurrence of a phenomenon that the squeezed adhesive 23 was adhered to the member (core) N ((b) of FIG. 2) holding the base material W. Further, the prepared 100 pressing belts 30 were checked with respect to another appearance, but a defective portion where squeezing non-uniformity or the like was generated was not observed. By using the pressing belt 30 manufactured in this embodiment, when a solid image was outputted in the OHP sheet, the image defect or the like was not generated.

From the above result, in this embodiment, similarly as in Embodiment 1, it was understood that the defective product rate was able to be lowered.

[Other Embodiments]

(1) In Embodiments 1 and 2, with respect to both of the heating member and the pressing member as the fixing member, the endless belt member was described, but the fixing member is not limited thereto. As the fixing member, a roller-shaped member including a roller-shaped (column-shaped) or hollow roller-shaped (cylinder-shaped) base substrate 21 having rigidity, the cylindrical elastic layer 22 formed over the outer peripheral surface of the base substrate, and the fluorine-containing resin tube 24 coating over the surface of the elastic layer 22 may also be used.

(2) In the image heating fixing device A, other than the device for fixing or temporarily fixing the unfixed toner image (visualized image or developer image) as a fixed image by heating the unfixed toner image by using the fixing member, also a device for modifying a surface property such as gloss by re-heating the fixed toner image is included.

While the invention has been described with reference to the structures disclosed herein, it is not confined to the details set forth and this application is intended to cover such modifications or changes as may come within the purpose of the improvements or the scope of the following claims.

This application claims priority from Japanese Patent Application No. 237945/2012 filed Oct. 29, 2012, which is hereby incorporated by reference.

What is claimed is:

1. A fixing member manufacturing method comprising:
    a first step of fitting a resin tube around an elastic material; and
    a second step of squeezing an excessive adhesive from between the elastic material and the resin tube,
    wherein said second step comprises:
    a step of fitting, around the resin tube in a longitudinal end side, a ring member having an inner diameter larger than an outer diameter of the resin tube fitted around the elastic material;
    a step of elastically contracting the ring member by air pressure; and
    a step of moving the ring member from the longitudinal end side toward another longitudinal end side of the resin tube while bringing an inner peripheral surface of the ring member, which is contracted by the air pressure, into contact with an outer peripheral surface of the resin tube.

2. The fixing member manufacturing method according to claim 1, further comprising a step of removing the ring member from the resin tube after the air pressure applied to the ring member that is in said another longitudinal end side of the resin tube is eliminated.

3. The fixing member manufacturing method according to claim 1, further comprising a step of removing the ring member from the resin tube after negative pressure is applied to the ring member that is in said another longitudinal end side of the resin tube.

4. The fixing member manufacturing method according to claim 1, further comprising, before said first step, a step of coating an outer peripheral surface of the elastic material with the adhesive.

5. The fixing member manufacturing method according to claim 4, further comprising:
    a step of holding the resin tube at a longitudinal end portion by a first holding tool and holding the resin tube at another longitudinal end portion by a second holding tool;
    a step of decreasing, by a predetermined amount, a distance between the first and second holding tools which hold the resin tube; and
    a step of expanding the resin tube in a radial direction in a state in which the distance between the first and second holding tools has been decreased by the predetermined amount,
    wherein in said first step, the resin tube is expanded.

6. The fixing member manufacturing method according to claim 5, further comprising:
    a step of increasing, by a predetermined amount, the distance between the first and second holding tools to elongate the resin tube, fitted around the elastic material, in a longitudinal direction; and
    a step of temporarily fixing the resin tube onto the elastic material by locally heating the resin tube at the longitudinal end portions in a state in which the resin tube is elongated in the longitudinal direction before said second step.

7. The fixing member manufacturing method according to claim 6, wherein in said temporary fixing step, at said another longitudinal end portion of the resin tube, a plurality of portions to be heated and a plurality of portions not to be heated are alternately formed with respect to a circumferential direction.

8. The fixing member manufacturing method according to claim 6, further comprising:
- a step of fixing the resin tube onto the elastic material by heating, after said second step, the adhesive located between the elastic material and the resin tube; and
- a step of cutting away a region, where the resin tube is temporarily fixed onto the elastic material in said temporary fixing step, from the resin tube fixed onto the elastic material in said fixing step.

9. The fixing member manufacturing method according to claim 1, wherein the resin tube is a fluorine containing resin tube.

10. The fixing member manufacturing method according to claim 9, wherein the fluorine containing resin tube is a PFA tube.

11. The fixing member manufacturing method according to claim 1, wherein said contracting step and said moving step are concurrently performed.

\* \* \* \* \*